Oct. 10, 1939.   E. REED   2,175,616
WELDING AND ROLLING MECHANISM
Filed March 22, 1939
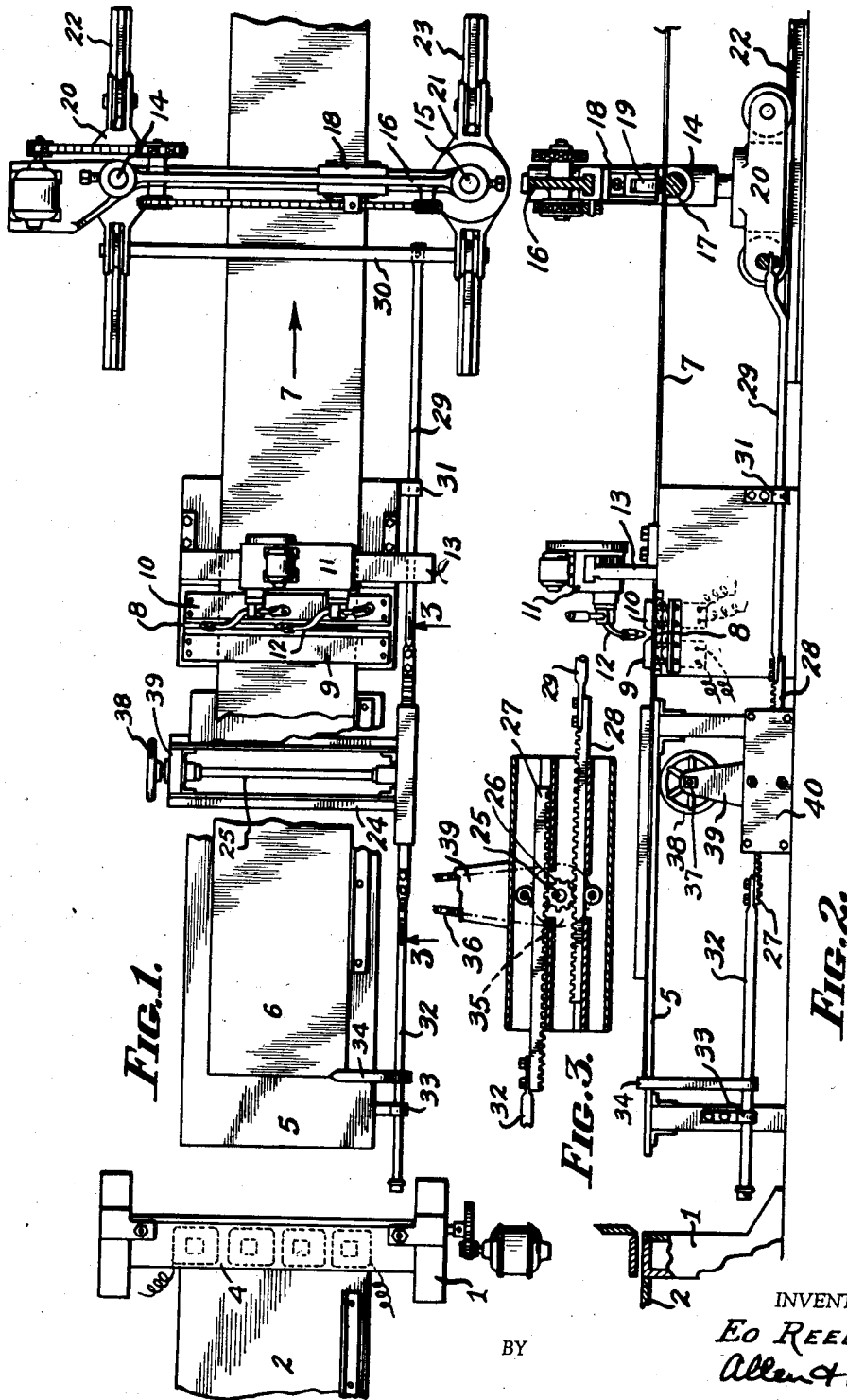
INVENTOR.
*Eo Reed.*
Allen + Allen
ATTORNEYS.

Patented Oct. 10, 1939

2,175,616

UNITED STATES PATENT OFFICE 2,175,616

WELDING AND ROLLING MECHANISM

Eo Reed, Zanesville, Ohio, assignor to The American Rolling Mill Company, Middletown, Ohio, a corporation of Ohio Application March 22, 1939, Serial No. 263,477

10 Claims. (Cl. 29—33)

My invention relates to mechanism including means for welding work pieces end to end to form continuous lengths, and including means for rolling the welded joint after welding. As exemplary of a field of utility of my invention (though without limitation) reference may be made to the copending applications of Fay and Reed, Ser. No. 132,824 and Ser. No. 132,825, filed March 24, 1937. With the organization of mechanisms disclosed in those cases, thin silicon steel sheets for example, are first sheared while being clamped under certain conditions. Then a sheared strip is moved to a welding station, where an end of it is butt welded to an end of a preceding sheet, already forming part of a welded strip of indefinite length. Then, the strip is moved so that the welded joint comes to a rolling station where it is rolled.

It is advantageous to roll one welded joint while another is being made, both because of the saving in time effected by doing the two operations simultaneously rather than successively, and also because it is advisable to roll the welded joint as soon after welding as possible. This, however, involves a problem, for if there is any variation in the length of the sheets when a welded joint is at the rolling station in position for rolling, the end of the last sheet may not be in position for welding at the welding station or vice versa. When this happens, the welding and rolling must be carried on as successive rather than simultaneous operations. Consequently, to avoid this, it has hitherto been my practice to shear the sheets exactly to the same length. But this involves inconvenience and delay in measuring the length of the pieces accurately, and, more importantly, involves considerable wastage of material, since it is not possible to cut the maximum effective length from each sheet. On the contrary, a standard length must be adopted which is the longest effective length of the shortest sheet which will be encountered, and all useful metal over this length must be cut off as scrap.

The primary object of my invention is to provide a means and method for solving this problem so that the greatest effective length of each sheet may be utilized, and yet welding and rolling may be accomplished simultaneously. This and ancillary objects which will be pointed out hereinafter or will be apparent to one skilled in the art upon reading these specifications, I accomplish by that certain construction and arrangement of parts of which I shall now describe an exemplary embodiment. Reference is made to the drawing, wherein:

Figure 1 is a plan view of the apparatus; and

Fig. 2 an elevation thereof, with parts in section.

Fig. 3 is a sectional view of a portion of the apparatus taken along the line 3—3 of Fig. 1.

Essentially in the practice of my invention, I provide means for adjusting the spacing of the line of rolling from the line of welding for each fresh work piece being welded on to the strip, to a distance equivalent to the length of the strip. Then after the weld has been made at the leading end of the work piece, and the strip is moved up so that still another work piece may be joined to its trailing end, the line of weld will be in the correct position.

In Fig. 1, I represents a shear having a table 2, and magnetic hold-down means 4. At the shear, the sheets are trimmed as set forth in the copending cases noted above. The sheets next pass to a welding station having a table 5, on which fresh sheets 6 may be placed. The leading end of the sheet 6 is butted to the trailing end of a strip 7 at a welding line 8, which is at a fixed position. There, the end portions of the sheet and strip respectively are held by clamps 9 and 10. In the exemplary embodiment, a carriage 11, bearing welding means 12 is driven crosswise of the work on a bridge 13, so as to form the weld.

When the weld has been formed the strip is moved on in the direction of the arrow, so as to position the weld at a rolling station. Here there is a suitable rolling apparatus, comprising, for example, upright frame members 14 and 15, a cross-rail 16, and an anvil rail 17. A carriage 18 is driven along the cross-rail. It bears one or more rolls 19, which press the work against the anvil rail during their traverse of the work, whereby to roll it.

The apparatus thus far outlined is described in detail in the copending cases above, and is exemplary of a field of utility for the present invention. In the practice of my invention, when a weld is being rolled by the roll 19, the trailing end of the strip is accurately located at the welding line 8, in spite of variations in the length of the sheets being joined to form the composite strip. This is accomplished by the use of means for moving the rolling device to a distance from the welding line 8 which is exactly equal to the length of the fresh work piece being joined to the strip. To this end, the rolling mechanism is mounted upon carriages 20 and 21, whereby it may be moved along tracks 22 and 23, so that its distance from the welding line 8 may be adjusted.

At the welding station, I provide a framework 24 in which I journal a shaft 25 bearing a pinion 26. This pinion meshes with racks 27 and 28, one above and one below it. I have shown the rack 28 connected, by a rod 29, to a cross brace 30 fastened to the carriages 20 and 21 of the rolling device. The rod 29 may, if desired, be slidably mounted in one or more brackets 31.

The other rack 27 is shown connected to a rod 32 which may be slidably mounted in one or more bracket means 33. The rod 32 bears a pointer means 34. It will be clear that as the pinion 26 rotates, the racks will be moved equally in opposite directions. The arrangement is such that the pointer 34 will at all times be the same distance forward of the welding line 8 as the rolling device (i. e., the center line of the anvil rail 17) is behind it.

It is convenient to locate the framework 24 beneath the table 5 of the welding device, though any other location may be chosen. The shaft 25 bears a sprocket 35 which is connected by a chain 36 to a sprocket on a shaft 37. This shaft is provided with a suitable means whereby it may be rotated in a controlled manner, either by power or by hand. I have shown a hand wheel 38, located in a position of convenient access to an operator. Housings 39 and 40 may be provided for the chain and sprockets, and for the rack and pinion arrangements, as a matter of safety.

In the operation of the mechanism, let it be supposed that a weld is being made at the line 8, and simultaneously a previous weld is being rolled in the rolling apparatus. Let it be further supposed that the sheet 6 being joined to the strip 7 is of different length than the sheet previously joined. Were the strip merely moved to a new position for welding, the weld now being formed would not be in position for rolling. With my apparatus, upon the completion of the present rolling operation, and prior to movement of the strip, the operator moves the hand wheel 38 so as to bring the pointer 34 to the end of the sheet 6. This operation moves the rolling device (whether forward or back) to a position distant from the welding line 8 by the quantum of the length of the sheet 6. Thus, when the weld is finished and the strip is moved, the weld just formed will be at the rolling station when the trailing end of sheet 6 is at the line 8. The operation of moving the rolling mechanism for the next rolling operation may usually be accomplished without loss of time during welding, since the welding cycle is usually longer than the rolling cycle. In any case, however, the moving of the rolling means is accomplished before movement of the strip.

Modifications may be made in my invention without departing from the spirit of it. Having thus described my invention, what I claim as new and desire to secure by Letters Patent is:

1. In mechanism of the character described, a welder and a rolling device, said rolling device being mounted for movement to and from said welder, and means for positioning said rolling device at a distance from said welder equivalent to the length of any sheet being welded to a continuous supply at said welder so that, after the formation of weld whereby said sheet is joined to said continuous supply, said rolling device will be in a position to operate upon the weld so formed while another weld is being formed at the opposite end of said sheet.

2. In mechanism of the character described, a welder and a rolling device, said rolling device being mounted for movement to and from said welder, and means for positioning said rolling device at a distance from said welder equivalent to the length of a sheet being welded to a continuous supply at said welder so that after the formation of weld whereby said sheet is joined to said continuous supply, said rolling device will be in a position to operate upon the weld so formed while another weld is being formed at the opposite end of said sheet, said means comprising means for moving said rolling device toward and away from said welding device, and concurrently acting means for moving a pointer equally but in opposite directions whereby when said pointer is placed at the end of said sheet, said rolling device will be clearly positioned with respect to said welder.

3. In mechanism of the character described, a welder and a rolling device, said rolling device being mounted for movement to and from said welder, and means for positioning said rolling device at a distance from said welder equivalent to the length of a sheet being welded to a continuous supply at said welder so that after the formation of weld whereby said sheet is joined to said continuous supply, said rolling device will be in a position to operate upon the weld so formed while another weld is being formed at the opposite end of said sheet, said means comprising means for moving said rolling device toward and away from said welding device, and concurrently acting means for moving a pointer equally but in opposite directions whereby when said pointer is placed at the end of said sheet, said rolling device will be clearly positioned with respect to said welder, said moving means comprising a pair of racks, one having connection with said rolling device and the other having connection with said pointer, and a pinion for concurrently moving said racks.

4. In mechanism of the character described, a welder and a rolling device, said rolling device being mounted for movement to and from said welder, and means for positioning said rolling device at a distance from said welder equivalent to the length of a sheet being welded to a continuous supply at said welder so that after the formation of weld whereby said sheet is joined to said continuous supply, said rolling device will be in a position to operate upon the weld so formed while another weld is being formed at the opposite end of said sheet, said means comprising means for moving said rolling device toward and away from said welding device, and concurrently acting means for moving a pointer equally but in opposite directions whereby when said pointer is placed at the end of said sheet, said rolling device will be clearly positioned with respect to said welder, said moving means comprising a pair of racks, one having connection with said rolling device and the other having connection with said pointer, and a pinion for concurrently moving said racks, and means for moving said pinion located in a position of accessibility to an operator at said welder.

5. In mechanism of the character described, a feed table for sheets, a welder for joining one end of said sheets to a continuous supply of metal being formed by welding a rolling device positioned on the side of said welder opposite said feed table and adapted to roll welds formed in said continuous supply, said rolling device being movably mounted, and means to position said rolling device at a distance from said welder equivalent to the length of a sheet on said feed table, an end of which is being welded to said continuous supply at said welder.

6. In mechanism of the character described, a feed table for sheets, a welder for joining one end of said sheets to a continuous supply of metal being formed by welding a rolling device positioned on the side of said welder opposite said feed table and adapted to roll welds formed in said continuous supply, said rolling device being movably mounted, and means to position said rolling device at a distance from said welder equivalent to the length of a sheet on said feed table, an end of which is being welded to said continuous supply at said welder, said last mentioned means comprising a pointer, means for moving said pointer so as to set it at the end of a sheet on said feed table, and means for concurrently, equally and oppositely moving said rolling device.

7. In mechanism of the character described, a feed table for sheets, a welder for joining one end of said sheets to a continuous supply of metal being formed by welding a rolling device positioned on the side of said welder opposite said feed table and adapted to roll welds formed in said continuous supply, said rolling device being movably mounted, and means to position said rolling device at a distance from said welder equivalent to the length of a sheet on said feed table, an end of which is being welded to said continuous supply at said welder, said last mentioned means comprising a pointer, means for moving said pointer so as to set it at the end of a sheet on said feed table, and means for concurrently, equally and oppositely moving said rolling device, said moving means comprising a pair of racks connected respectively to said pointer and to said rolling device and a pinion engaging both racks so as to move them concurrently in opposite directions.

8. In mechanism of the character described, a feed table for sheets, a welder for joining one end of said sheets to a continuous supply of metal being formed by welding a rolling device positioned on the side of said welder opposite said feed table and adapted to roll welds formed in said continuous supply, said rolling device being movably mounted, and means to position said rolling device at a distance from said welder equivalent to the length of a sheet on said feed table, an end of which is being welded to said continuous supply at said welder, said last mentioned means comprising a pointer, means for moving said pointer so as to set it at the end of a sheet on said feed table, and means for concurrently, equally and oppositely moving said rolling device, said moving means comprising a pair of racks connected respectively to said pointer and to said rolling device and a pinion engaging both racks so as to move them concurrently in opposite directions, a shaft passing beneath said feed table, a driving connection between said shaft and said pinion, and means for rotating said shaft located in a position of accessibility to an operator at said welding.

9. In apparatus of the character described, a rolling mechanism comprising standards, an anvil extending between said standards, a beam above said anvil, rolling mechanism for rolling material against said anvil mounted for travel on said beam, tracks, carriages on said tracks on which said standards are mounted, and means for moving said carriages along said tracks.

10. In apparatus of the character described, a rolling mechanism comprising standards, an anvil extending between said standards, a beam above said anvil, rolling mechanism for rolling material against said anvil mounted for travel on said beam, tracks, carriages on said tracks on which said standards are mounted, and means for moving said carriages along said tracks, a welder for forming a continuous supply from individual work pieces, said means for moving said carriages comprising means for positioning said rolling device at a distance from said welder equivalent to the length of a work piece being joined at said welder to said continuous supply.

EO REED.